United States Patent [19]

Sakamoto et al.

[11] Patent Number: 4,532,573
[45] Date of Patent: Jul. 30, 1985

[54] STRUCTURE OF THE FEED-THROUGH CAPACITOR

[75] Inventors: Yukio Sakamoto, Fukui; Takeshi Tanabe, Takefu, both of Japan

[73] Assignee: Murata Manufacturing Co., Ltd., Kyoto, Japan

[21] Appl. No.: 561,353

[22] Filed: Dec. 14, 1983

[30] Foreign Application Priority Data

Dec. 18, 1982 [JP] Japan ............................... 57-191928

[51] Int. Cl.$^3$ .............................................. H01G 1/14
[52] U.S. Cl. .................................................... 361/307
[58] Field of Search ................................ 361/306, 307

[56] References Cited

U.S. PATENT DOCUMENTS 2,702,878  2/1955  Heibel ................................. 361/307
2,769,944  11/1956  Stein et al. ......................... 361/307
4,109,292  8/1978  Shibayama et al. ............. 361/306 X
4,319,304  3/1982  Fink ..................................... 361/307

Primary Examiner—Donald A. Griffin
Attorney, Agent, or Firm—Birch, Stewart, Kolasch & Birch

[57] ABSTRACT

A feed-through capacitor is provided with a tube-shaped dielectric material having a flange portion, an inward projected portion, and a sheath portion. On the inner and the outer surfaces of the tube-shaped dielectric material, an inner and an outer electrode are formed. A central aperture is formed as surrounded by the inner surface of the dielectric material. In the central aperture, a central shaft is inserted. The tube-shaped dielectric material is thick at the flange portion and the inward projected portion. On the inward projected portion, a projection is rested for supporting the central shaft.

4 Claims, 2 Drawing Figures

STRUCTURE OF THE FEED-THROUGH CAPACITOR

BACKGROUND OF THE INVENTION

The present invention relates to the structure of a capacitor and, more particularly, to the structure of a feed-through capacitor.

In a capacitor of the type in which an electrical conductor is a through dielectric element as named hereinafter, a feed-through capacitor, it is desired that without changing the external size of the capacitor, the electrostatic capacity be controlled. FIG. 1 shows a longitudinally sectional view of an example of such a feed-through capacitor.

Reffering to FIG. 1, a feed-through capacitor 1 includes a tube-shaped dielectric material 2. At the upper protions of the tube-shaped dielectric material 2, a flange portion 2a is formed for supporting the feed-through capacitor 1 on a chassis. To surround the tube-shaped dielectric material 2, an inner electrode 3 and an outer electrode 4 are provided. Surrounded by the inside of the tube-shaped dielectric material 2, an aperture 5 is formed within which an electrically conductive central shaft 6 is inserted.

To make the electrostatic capacity large without changing the exterior sizes of the feed-through capacitor, the diameter of the aperture 5 should be made larger and the diameter of the tube-shaped dielectric material 2 should be smaller. Because of this intention, the lower portions of the tube-shaped dielectric material 2 is made brittle, so that these portions may be damaged, in particular, during forming the inner and the outer electrodes 3 and 4. Further, a soldering material 7 may be introduced within the aperture 5 for fixing the electrically conductive central shaft 6 within the aperture 5 by curing the soldering material 7. In such a case, the fixed soldering material 7 may be resolved owing to the heat in positioning the feed-through capacitor 1 on a chassis with a soldering material, so that the electrically conductive central shaft 6 may be dropped from the soldering material 7. A washer 8 may be inserted.

If the tube-shaped dielectric material 2 becomes thin, the feed-through capacitor 1 may be damaged by external stress.

SUMMARY OF THE INVENTION

Accordingly, it is an object of the present invention to provide an improved feed-through capacitor whose mechanical strength is improved.

It is another object of the present invention to provide an improved feed-through capacitor having a thick portion at two ends of a dielectric material.

It is still another object of the present invention to provide an improved feed-through capacitor comprising a central shaft means supported by projected portions of a dielectric material.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to embodiments of the present invention, a feed-through capacitor within which a central conductor is inserted is constructed so that a tube-shaped dielectric material is provided which forms a flange portion, an inward projected portion, and a sheath portion for connecting the flange portion and the inward projected portion. On the inner and the outer surfaces of the tube-shaped dielectric material, inner and outer electrodes are formed. An aperture is formed as surrounded by the inner surface of the tube-shaped dielectric material. Within the aperture, an electrically conductive central shaft is inserted. A soldering material is filled within the aperture. On the inward projected portion of the tube-shaped dielectric material, a washer for supporting the electrically conductive central shaft is rested. The tube-shaped dielectric material is thick at the flange portion and the inward projected portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
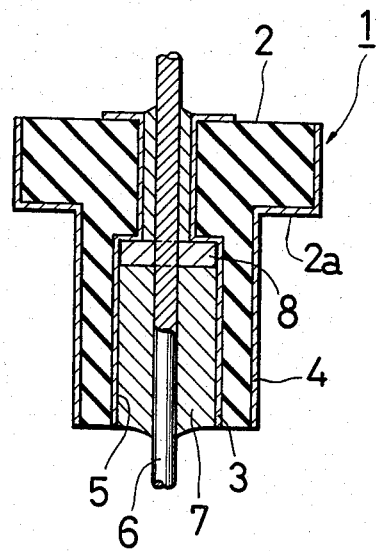
FIG. 1 shows a longitudinal sectional view of a conventional feed-through capacitor.
Figure 2:
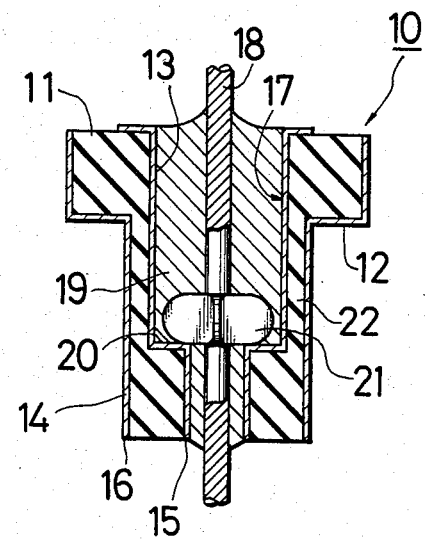
FIG. 2 shows a longitudinal sectional view of a feed-through capacitor according to the present invention.

FIG. 2 shows a longitudinal sectional view of a feed-through capacitor 10 according to the present invention. The feed-through capacitor 10 is constructed with a tube-shaped dielectric material 11 having a flange portion 12 at its upper position. On an inner side 13 and an outer side 14 of the tube-shaped dielectric material 11, an inner electrode 15 and an outer electrode 16 are formed to provide the capacitor. The inner side 13 surrounds a central aperture 17 in which an electrically conductive central shaft 18 is inserted. Within the central aperture 17, a soldering member 19 is filled.

The tube-shaped dielectric material 11 has the flange portion 12, an inward projected portion 20, and a sheath portion 22 for connecting the flange portion 12 and the inward projected portion 20. Therefore, the diameter of the central aperture 17 is larger adjacent the flange portion 12 than that adjacent the inward projected portion 20. A projection 21 is formed onto the electrically conductive central shaft 18 positioned adjacent the sheath portion 22 of the tube-shaped dielectric material 11. The projection 21 is formed onto the electrically conductive central shaft 18 so that, when the shaft 18 is inserted into the central aperture 17 from the position adjacent the flange portion 12, the projection 21 is rested against the inward projected portion 20. The projection 21 may be a washer or, spindle-shaped parts of the shaft 18 by stressing the shaft 18.

With the above-described configuration, to adjust an electrostatic capacity of the feed-through capacitor 10 without changing the exterior sizes thereof, the diameter of the central aperture 17 corresponding to the sheath portion 22 between the flange portion 12 and the inward projected portion 20 should be changed. It may be possible that the longitudinal length of the inward projected portion 20 should be changed in order to adjust electrostatic capacity of the feed-through capacitor 10 without changing the exterior sizes. It may be further possible that the presence of the sheath portion 22 is eliminated to directly couple the flange portion 12 and the inward projected portion 20.

According to the structure of the present invention, the tube-shaped dielectric material 11 is both ends by virtue of the presence of the flange portion 12 and the inward projected portion 20. Hence, the mechanical strength of the tube-shaped dielectric material 11 can be improved at the two ends thereof. Thus, the possibility that the tube-shaped dielectric material 11 may be broken when the inner electrode 15 and the outer electrode 16 are formed, and the electrically conductive central shaft 18 is inserted into the central aperture 17 is minimized.

When the feed-through capacitor 10 is positioned onto a chassis with soldering, the presence of the projection 21 on the inward projected portion 20 prevents the electrically conductive central shaft 18 from being dropped from the central aperture 17 even when the soldering material 19 is resolved. Possibly, the electrically conductive central shaft 18 is normally soldered on the printed circuit board by bending the shaft 18.

In such a case, it is preferable that, the whole preferably or at least part of the projection 21 of the electrically conductive central shaft 18 is embedded into the soldering material 17. That is because it is assured that the feed-through capacitor 10 is mechanically strong. The part of the electrically conductive central shaft 18 protruding from the tube-shaped dielectric material 11 may be easily bent even when the part is positioned just adjacent the edge of the tube-shaped dielectric material 11. It can be prevented that the feed-through capacitor 10 is broken or positioned on the printed circuit board or the like at an angle.

As described above, in accordance with the present invention, the feed-through capacitor is provided with the tube-shaped dielectric material having a flange portion, the inward projected portion, and the sheath portion for connecting the flange portion and the inward projected portion. On the inner and the outer surfaces of the tube-shaped dielectric material, the inner and the outer electrodes are formed. The central aperture is formed as surrounded by the inner surface of the tube-shaped dielectric material. In the central aperture, the electrically-conductive central shaft is inserted. The soldering material is filled within the central aperture. The tube-shaped dielectric material is thick at the flange portion and the inward projected portion. On the inward projected portion, a shaft projection is rested for supporting the electrically conductive central shaft.

To change the electrostatic capacity of the feed-through capacitor without changing the exterior sizes, the diameter of the central aperture or the longitudinal length of the inward projected portion is adjusted.

Since the tube-shaped dielectric material is thick at the flange portion and the inward projected portion at the two ends, it is very strong as compared to the conventional through having the same exterior sizes as the feed-through capacitor of the present invention. It is unlikely that the tube-shaped dielectric material will be broken even when the inner and the outer electrodes are formed on the inner and the outer surfaces of the tube-shaped dielectric material or when the electrically-conductive central shaft is inserted into the central aperture. When the feed-through capacitor is connected with a chassis with soldering and the soldering material in the central aperture is resolved, the resting of the projection of the electrically conductive central shaft on the inward projected portion provides a stop which prevents the electrically conductive central shaft from being dropped from the central aperture.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A feed-through capacitor comprising:
   a tube-shaped dielectric material having a flange portion and an inward projected portion;
   the tube-shaped dielectric material having an aperture at the center;
   soldering material filled within the aperture;
   an inner and an outer electrode covering the inner and the outer surfaces of the tube-shaped dielectric material;
   an electrically conductive shaft inserted into the aperture; and
   projection means formed on the electrically conductive shaft, the projection rested on the inward projected portion of the tube-shaped dielectric material.

2. The capacitor as set forth in claim 1, further comprising a sheath portion of the tube-shaped dielectric material for connecting the flange portion and the inward projected portion.

3. The capacitor as set forth in claim 1, wherein the diameter of the aperture between the flange portion and the inward projected portion of the tube-shaped dielectric material is changeable to adjust the electrostatic capacitance of the capacitor.

4. The capacitor as set forth in claim 1, wherein the longitudinal length of the inward projected portion of the tube-shaped dielectric material is changeable to adjust the electrostatic capacitance of the capacitor.

* * * * *